3,515,668
OLEOPHILIC GRAPHITE AND HEAVY METAL SULPHIDES
Aleksander Jerzy Groszek, London, England, assignor to The British Petroleum Company Limited, London, England
No Drawing. Filed Aug. 15, 1968, Ser. No. 752,753
Claims priority, application Great Britain, Aug. 24, 1967, 38,979/67
Int. Cl. C10m 5/02
U.S. Cl. 252—12                              1 Claim

ABSTRACT OF THE DISCLOSURE

Solid carbon compositions for use as seals e.g. in gasoline pumps, can be formed by compressing oleophilic graphite, with or without a binder and optionally with reinforcing agents or solid lubricants.

---

This invention relates to solid compositions, more particularly it relates to compositions suitable for forming shaped self-lubricating articles. Suitable materials for forming the compositions of the present invention include carbon and metal sulphides.

Carbon finds wide application in the petroleum and petrochemical industries because it is self-lubricating, resists chemical attack, withstands large and rapid temperature changes and can be machined readily by conventional means. These industires handle many gases and liquids that cannot provide the lubrication that is necessary between moving surfaces. On account of the electrical conductivity of carbon it is also used in the electrical industry where it is necessary to provide an electrical connection between relatively moving surfaces, for example, in brushes, commutators and electrical pick-ups.

A carbon composition suitable for use in industrial components consists of a mixture of carbon and graphite particles. These are bonded together with a viscous substance, such as coal tar pitch, that can be transformed into carbon by heat treatment. The result is a rigid body, and any undesirable porosity can be filled by impregnation with resins or metals.

In order to produce a harder and more compact body the mixture of carbon and graphite particles, together with a thermosetting resin, such as a phenol/formaldehyde resin, is subjected to high pressure and high temperatures. Typical pressures are from 10–15 tons per square inch, and typical temperatures are above 800° C. The exact temperature and pressure used will depend on the nature of the graphite and carbon particles, the thermosetting resin, and on the us to which the composition is to be put.

It is desirable that the solid carbon composition should have as high a degree of self-lubrication as possible, and solid lubricants such as molybdenum disulphide can be incorporated in solid carbon compositions to increase the self-lubrication properties thereof.

In order to provide less permeable and stronger solid carbon compositions, reinforcing agents such as metals are incorporated therein. Suitable metals include copper, aluminium, iron and the transition metals. The metals can be impregnated into porous or semiporous formed carbon compositions, or powdered metals can be added to the carbon particle, graphite particle, and binder mixture before it is formed into a solid.

Carbon compositions incorporating powdered metals are especially useful in forming electrically conductive devices, the metal constituents serving to reduce the electrical resistance.

We have now found that improved solid compositions can be obtained which consist wholly or partly of an oleophilic solid.

According to the invention there is provided a solid composition consisting wholly or partly of an oleophilic solid. The oleophilic solids which can be used in the present invention are oleophilic graphite or an oleophilic metal sulphide.

Oleophilic graphite is graphite having a heat of adsorption of n-dotriacontane from n-heptane of at least 700 millicalories per gram and a heat of adsorption of n-butanol from n-heptane of less than 200 millicalories per gram.

Oleophilic metal sulphides are metal sulphides having a ratio of heat of adsorption of n-dotriacontane from n-heptane to heat of adsorption of n-butanol from n-heptane of at least 1:2 and preferably at least 1:1.

The solid compositions of the present invention containing oleophilic graphite include compositions consisting of only oleophilic graphite, compositions consisting of oleophlic graphite together with other carbon powders and with or without a binder, compositions which also contain a solid lubricant such as molybdenum disulphide and compositions which also contain a reinforcing metal powder. The solid compositions which contain an oleophilic metal sulphide include compositions consisting of only the oleophilic metal sulphide, compositions which consist of an oleophilic metal sulphide together with a reinforcing metal powder, and compositions consisting of an oleophilic metal sulphide together with a carbon powder and with or without a binder.

When the solid compositions contains material other than the oleophilic solid then it preferably contains at least 5% wt. of the oleophilic solid and preferably at least 25% by weight. When a reinforcing metal powder is present the powder can be present in amount of 5–95% by wt. based on the total weight of the composition. When a binder is required to form a composition with greater integral strength the binder is preferably present in an amount of up to 10% by weight.

The oleophilic graphite is prepared by grinding natural of synthetic graphite in a low boiling point, low viscosity, low surface tension organic liquid, in the substantial absence of air.

Satisfactory products can be obtained by grinding in most organic liquids but it is desirable to use one the bulk of which can be easily removed from the oleophilic graphite. Those liquids distilling below 500° C. and having a viscosity below 600 centistokes at 100° F. (38° C.) are therefore preferred. Liquids having a surface tension below 72 dynes/cm., preferably from 10 to 40 dynes/cm., at 25° C. are preferred.

Suitable organic liquids are lower molecular weight hydrocarbons, including straight-chain or branched-chain, saturated or unsaturated aliphatic, saturated or unsaturated, substituted or unsubstituted, cycloaliphatic, and substituted or unsubstituted aromatic compounds. Examples of such compounds are n-heptane, octene-2, 2,2,4-trimethylpentane, cyclohexane, benzene or toluene. Branched alkyl compounds are particularly preferred. Other suitable organic liquids are those compounds which contain fluorine, chlorine, or phosphorus and chlorine, for example, carbon tetrachloride.

Other suitable organic liquids are the polar oxygen compounds such as isopropyl alcohol. Silicone fluids can also be used.

For best results, the amount of graphite in the graphite/organic liquid mixture should not exceed 50% wt.; preferably it should be from 2 to 20% wt.

The grinding may be carried out in any suitable grinding mill of device and it is desirable to continue the grinding until an olephilic graphite having a surface area (as determined by nitrogen adsorption) of from 20 to 800, preferably from 30 to 200, square metres per gram is obtained. Usually this can be achieved by grinding at normal temperatures for the required period but the temperature of the mixture may be artificially increased if desired, for example, up to 400° C. In this case, liquids which have viscosities up to 600 centistokes at 100° F. (38° C.) may be used, for example, mineral lubricating oils, ranging from "spindle" oils to "bright stocks."

One of the quickest and most effective techniques is to carry out the grinding in a vibratory ball mill.

It is desirable to exclude air so far as possible during the grinding operation and this can be most easily achieved by filling the mill with the organic liquid first, followed by the balls and graphite.

A suitable procedure is to fill the mill with the liquid, add half the balls, then the graphite and finally the rest of the balls.

When using a ball mill, it is of course desirable to use balls made of a material which does not react with the graphite and which does not wear unduly during the grinding. Vibratory ball mills usually contain steel balls and these are suitable for the present purpose. It is preferred to use a hard grade of steel for the balls.

A magnetic filter can be used to remove small steel particles from the slurry. A circulatory system can also be used wherein the slurry is pumped through an external magnetic filter and then returned to the mill.

The grinding effect is produced by the impact of the balls upon the graphite and upon each other.

The slurry of oleophilic graphite can be separated from the balls by sieving or by displacement by another liquid and sieving.

If a relatively high boiling organic liquid is used for grinding it is preferred to displace this liquid by a low boiling liquid. This liquid can then be removed by boiling from the slurry. It is preferred to use vigorous boiling.

It is also possible to filter the slurry to obtain a filter cake of oleophilic graphite.

In either case it is preferred to remove the last traces of solvent by heating the filter cake in a vacuum oven for several hours, for example, at 100° C. and at 1 mm. mercury.

Oleophilic metal sulphides are made substantially the same way as oleophilic graphite. The parent sulphide, for example molybdenum disulphide or tungsten disulphide is ground in similar liquids to those used for oleophilic graphite.

The powder metals which can be used as a reinforcing agent include ultra fine metal powder. These powders are prepared by grinding a metal in an organic liquid in the presence of a load-carrying additive or a lubricating additive, they preferably have surface areas of at least 2 square metres per gram and bulk densities of less than 1 gm. per cc. These powders themselves possess lubricating properties and are thus very suitable for incorporation into compositions which need to have low-friction characteristics.

If desired, a finely divided metal powder, olephilic graphite and an olephilic sulphide can all be incorporated together in the compositions of the present invention, the amount of each present depending on the use for which the carbon composition is to be put. If desired, non-oleophilic graphite can also be present in the composition.

Oleophilic graphite and oleophilic metal sulphides can be formed into solid bodies by compaction without any binder being present Non-olephilic graphite does not possess that property. The pressure used is preferably between 10 and 50 tons per square inch and more preferably is between 15 and 30 tons per square inch.

Olephilic graphite and olephilic metal sulphides are non-abrasive in contrast to the corresponding non-oleophilic compounds and solid bodies made entirely from oleophilic compounds have improved self-lubricating properties.

Oleophilic graphite and oleophilic molybdenum disulphide powders were produced and their properties shown in the following Table 1. These powders were produced by grinding the material in n-heptane in a vibratory ball mill at a vibrational amplitude of 4 mm. and a vibrational frequency of 3000 cycles per minute for 8 hours.

TABLE 1

| Material | Surface area, metres²/gm. | Heat of adsorption of n-$C_{32}$ in cals. | Heat of adsorption of n-butanol in cals. | |
|---|---|---|---|---|
| Graphite | 100 | 1.40 | 0.07 | 20.0 |
| MoS₂ | 39 | .380 | .470 | 1.23 |

These powders were compressed in a conventional press in the absence of a binder and tested in a pin-and-disc machine and their properties shown in Table 2.

TABLE 2

| Powder | Pressure tons per sq. inch | Density of body, g./cc. | Resistance to wear "k" value, cm.²/cm. g.×10⁻¹³ |
|---|---|---|---|
| Commercial graphite powder | 20 | (²) | |
| Oleophilic graphite | 18 | 1.56 | |
| Do | 20 | 1.87 | 1.0 |
| Commercial MoS₂ powder | 20 | 3.7 | 141.0 |
| Oleophilic MoS₂ | 18 | 3.7 | |
| Oleophilic NoS₂ | 20 | 4.1 | 42.0 |
| 50/50 Oleophilic graphite/iron powder ¹ | 25 | 2.2 | |
| 5/95 Oleophilic graphite/iron powder ¹ | 25 | 3.4 | |

¹ The iron powder was prepared by grinding iron n-heptane containing 1% carbon tetrachloride and had a surface area of 27 metres per gram.
² No compact formed.

The solid carbon compositions of the present invention are especially useful in the formation of carbon sealing rings used in the pumping of petroleum products. They are also useful as pump glands, rotary bearings e.g., in turbine shafts and thrust plates, and they are able to sustain an improved load at a low rate of wear.

What we claim is:

1. A solid seal and bearing composition consisting of a compound selected from oleophilic graphite and heavy metal sulphides prepared by grinding a compound selected from graphites and heavy metal sulphides in an organic liquid distilling below 500° C., having a viscosity below 600 centistokes at 38° C., and having a surface tension below 72 dynes/cm. at 25° C. until said compound becomes oleophilic and has a surface area of from 20 to 800 square meters per gram, separating the oleophilic compound from the organic liquid, and compressing said oleophilic compound at a pressure from 10–50 tons per square inch.

References Cited

UNITED STATES PATENTS 3,383,311   5/1968   Groszek _____ 252—29

DANIEL E. WYMAN, Primary Examiner

I. VAUGHN, Assistant Examiner